(12) United States Patent
Kinomura

(10) Patent No.: US 9,627,911 B2
(45) Date of Patent: Apr. 18, 2017

(54) ELECTRIC-MOTOR VEHICLE, POWER EQUIPMENT, AND POWER SUPPLY SYSTEM INCLUDING LIMITING DISCHARGING AFTER THE POWER STORAGE DEVICE IS EXTERNALLY CHARGED

(75) Inventor: Shigeki Kinomura, Suntou-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 185 days.

(21) Appl. No.: 14/384,229

(22) PCT Filed: Mar. 21, 2012

(86) PCT No.: PCT/JP2012/057133
§ 371 (c)(1),
(2), (4) Date: Sep. 10, 2014

(87) PCT Pub. No.: WO2013/140536
PCT Pub. Date: Sep. 26, 2013

(65) Prior Publication Data
US 2015/0054466 A1 Feb. 26, 2015

(51) Int. Cl.
*H02J 7/00* (2006.01)
*B60L 11/18* (2006.01)
(Continued)

(52) U.S. Cl.
CPC ............ *H02J 7/007* (2013.01); *B60L 3/0046* (2013.01); *B60L 11/184* (2013.01);
(Continued)

(58) Field of Classification Search
CPC  B60L 11/1816; B60L 11/1825; B60L 11/184; B60L 11/1842; B60L 11/1844;
(Continued)

(56) References Cited

U.S. PATENT DOCUMENTS 6,104,160 A * 8/2000 Iwata ................... B60L 3/0092
307/66
2006/0244411 A1 11/2006 Wobben
(Continued)

FOREIGN PATENT DOCUMENTS

CN          1816463 A    8/2006
CN        102244401 A   11/2011
(Continued)

*Primary Examiner* — Richard Isla Rodas
*Assistant Examiner* — Manuel Hernandez
(74) *Attorney, Agent, or Firm* — Andrews Kurth Kenyon LLP

(57) ABSTRACT

A vehicle includes a power storage device, a power node, and a controller. The controller controls charging and discharging of the power storage device with respect to the outside of the vehicle when the power storage device is able to be charged or discharged with electric power with respect to the outside of the vehicle via the power node. The controller controls discharging of electric power from the power storage device so as to provide a first period in which discharging of electric power from the power storage device to the outside of the vehicle is limited after the power storage device is externally charged with a power supply outside the vehicle, and so as to provide a second period in which discharging limitation in the first period is released at least after the first period ends.

25 Claims, 7 Drawing Sheets

(51) Int. Cl.
*B60L 3/00* (2006.01)
*H02J 7/04* (2006.01)
*H01M 10/44* (2006.01)

(52) U.S. Cl.
CPC ....... *B60L 11/1816* (2013.01); *B60L 11/1825* (2013.01); *B60L 11/1842* (2013.01); *B60L 11/1844* (2013.01); *B60L 11/1862* (2013.01); *H02J 7/0004* (2013.01); *H02J 7/0027* (2013.01); *H02J 7/04* (2013.01); *B60L 11/1811* (2013.01); *B60L 2230/16* (2013.01); *B60L 2230/40* (2013.01); *B60L 2240/547* (2013.01); *B60L 2240/549* (2013.01); *B60L 2240/80* (2013.01); *B60L 2250/12* (2013.01); *B60L 2260/58* (2013.01); *H01M 10/44* (2013.01); *Y02E 60/721* (2013.01); *Y02T 10/705* (2013.01); *Y02T 10/7005* (2013.01); *Y02T 10/7044* (2013.01); *Y02T 10/7055* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC  B60L 11/1811; B60L 3/0046; B60L 11/1862; H02J 7/007; H02J 7/0004; H02J 7/0027; H02J 7/04
USPC ........................................................ 320/134
See application file for complete search history.

(56) References Cited

U.S. PATENT DOCUMENTS

| | | | |
|---|---|---|---|
| 2008/0215200 A1* | 9/2008 | Toth | B60L 11/14 701/22 |
| 2009/0206779 A1 | 8/2009 | Wobben | |
| 2009/0313103 A1 | 12/2009 | Ambrosio et al. | |
| 2010/0097036 A1 | 4/2010 | Wakayama | |
| 2010/0106332 A1* | 4/2010 | Chassin | G06Q 20/102 700/278 |
| 2011/0210698 A1* | 9/2011 | Sakai | H02J 7/041 320/109 |
| 2011/0282513 A1 | 11/2011 | Son et al. | |
| 2012/0229077 A1* | 9/2012 | Tsuchiya | H02J 3/32 320/107 |
| 2013/0009485 A1* | 1/2013 | Sakuma | H02J 3/32 307/81 |
| 2013/0169233 A1 | 7/2013 | Tonegawa et al. | |
| 2016/0347195 A1* | 12/2016 | Bridges | B60L 11/1844 |

FOREIGN PATENT DOCUMENTS

| | | |
|---|---|---|
| JP | 2001258177 A | 9/2001 |
| JP | 2007330083 A | 12/2007 |
| JP | 2008278585 A | 11/2008 |
| JP | 2010-98897 A | 4/2010 |
| JP | 2010-148283 A | 7/2010 |
| JP | 2010-268602 A | 11/2010 |
| JP | 2011-244682 A | 12/2011 |
| JP | 2012-005227 A | 1/2012 |
| JP | 2012-39725 A | 2/2012 |
| WO | 2012/017298 A2 | 2/2012 |
| WO | 2013/076792 A1 | 5/2013 |

* cited by examiner

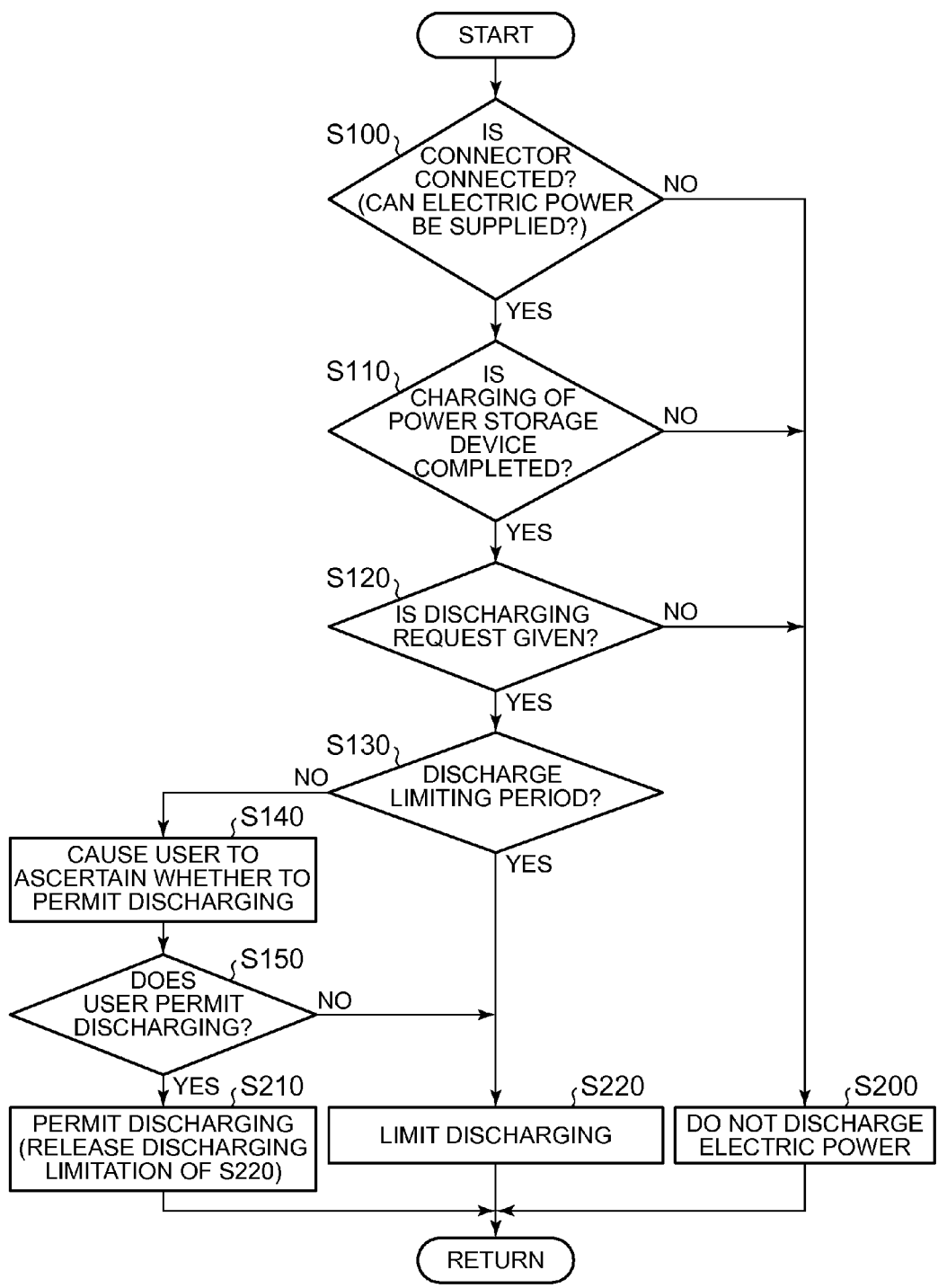

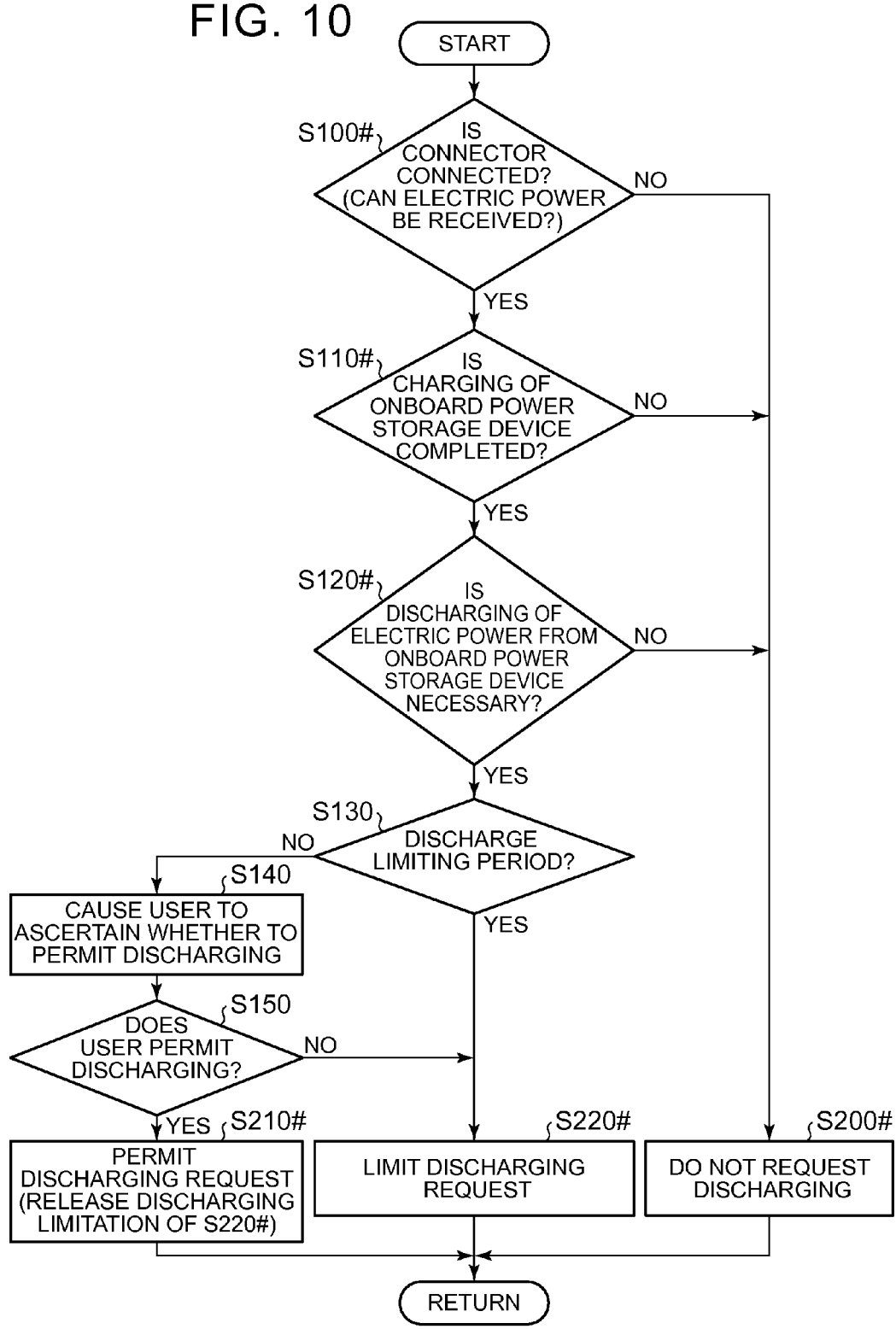

ELECTRIC-MOTOR VEHICLE, POWER EQUIPMENT, AND POWER SUPPLY SYSTEM INCLUDING LIMITING DISCHARGING AFTER THE POWER STORAGE DEVICE IS EXTERNALLY CHARGED

CROSS-REFERENCE TO RELATED APPLICATIONS

This is a national phase application based on the PCT International Patent Application No. PCT/JP2012/057133 filed Mar. 21, 2012, the entire contents of which are incorporated herein by reference.

TECHNICAL FIELD

The present invention relates to an electric-motor vehicle, power equipment, and a power supply system including the same, and more particularly, to a technique of supplying electric power discharged from an onboard power storage device to the outside of the electric-motor vehicle.

BACKGROUND ART

A power storage device that stores electric power for driving an electric motor is mounted on an electric-motor vehicle such as an electric automobile, a hybrid automobile, and a fuel-cell automobile that is configured to generate a vehicle driving force with the electric motor. As such an electric-motor vehicle, a so-called plug-in type electric-motor vehicle in which the onboard power storage device is charged with a power supply outside the vehicle (hereinafter, simply referred to as "external power supply") such as a commercial system power supply has been developed.

Japanese Patent Application Publication No. 2010-148283 (PTL 1) describes that an amount of power stored in a storage battery is controlled after the charging of the storage battery for an electric automobile that can be charged with an external power supply. Specifically, in a high-temperature state where the temperature of the storage battery is higher than a predetermined value, it is described that performance degradation of the storage battery in the high-temperature state is alleviated by discharging predetermined electric power from the storage battery to a predetermined power facility.

Japanese Patent Application Publication No. 2010-268602 (PTL 2) describes that a charging and discharging schedule of a storage battery is prepared on the basis of charging and discharging constraint conditions input by a user in controlling of the charging and discharging when "charging" or "discharging" is selected from a displayed charging and discharging control menu (see FIG. 5). Specifically, it is described that the storage battery is charged or discharged on the basis of the charging and discharging schedule prepared based on price information of electric power selling and purchasing, the charging and discharging constraint conditions input by the user, and information on the storage battery.

CITATION LIST

Patent Literature

PTL 1: Japanese Patent Application Publication No. 2010-148283 (JP 2010-148283 A)
PTL 2: Japanese Patent Application Publication No. 2010-268602 (JP 2010-268602 A)

SUMMARY OF THE INVENTION

Technical Problem

Regarding an electric-motor vehicle that can give and receive electric power to and from the outside of a vehicle, a system for supplying electric power to the outside of the vehicle by discharging of an onboard power storage device has been studied in consideration of the vehicle as a power supply source like a smart grid or the like. For example, when the peak of a commercial system power supply is suppressed by supplying electric power from the electric-motor vehicle to the outside of the vehicle, it is possible to enhance the effect of energy savings at the peak time of load power consumption.

However, when the supply of electric power to the outside of the vehicle is permitted without any limitation after the external charging of the onboard power storage device ends, the state of charge (SOC) of the power storage device is lowered at the time of a user's starting of driving of the electric-motor vehicle and thus a travel distance using the electric power stored in the power storage device may not be sufficiently secured.

On the other hand, when the discharging of electric power from the onboard power storage device to the outside of the vehicle is excessively inhibited, vehicle utilization as a power supply source is lowered and thus the user-friendliness may be lowered. Alternatively, as described in PTL 1, degradation of the power storage device may progress due to continuation of the high SOC.

PTL 2 describes that an optimal charging and discharging schedule in consideration of a cost merit or the like is determined for each of a charging control and a discharging control. However, PTL 2 does not teach nor propose how to control the charging and discharging after the external charging of the onboard power storage device ends in consideration of the charging and discharging of the power storage device as a single body.

The present invention is made to solve the above-mentioned problems and an object thereof is to appropriately control charging and discharging of an onboard power storage device with respect to the outside of a vehicle in an electric-motor vehicle configured to give and receive electric power to and from the outside of the vehicle.

Solution to Problem

According to an aspect of the present invention, there is provided an electric-motor vehicle including: an onboard power storage device; a power node that is used to give and receive electric power to and from the outside of the vehicle; and a controller that controls charging and discharging of the power storage device with respect to the outside of the vehicle in a state where the power storage device is able to be charged or discharged with electric power with respect to the outside of the vehicle via the power node. The controller controls discharging of electric power from the power storage device so as to provide a first period in which the discharging of electric power from the power storage device to the outside of the vehicle is limited after the power storage device is externally charged with a power supply outside the vehicle and a second period in which the discharging limitation in the first period is released at least after the first period ends.

Preferably, in the electric-motor vehicle, the controller sets the first period to a period from a time point at which the external charging of the power storage device ends to a time point at which a predetermined period of time elapses thereafter and sets the second period to a period after the predetermined period of time elapses.

Preferably, in the electric-motor vehicle, the controller controls the external charging on the basis of a charging end time designated by a user, sets the first period to a period from the charging end time to a time point at which the predetermined period of time elapses thereafter, and sets the second period to a period after the predetermined period of time elapses.

Alternatively, preferably, in the electric-motor vehicle, the controller performs discharging of electric power from the power storage device to the outside of the vehicle in response to a discharging request from a load outside the vehicle. More preferably, the controller causes a user to ascertain whether to discharge electric power from the power storage device when the discharging request is given in the second period.

Preferably, in the electric-motor vehicle, the controller causes a user to ascertain whether to perform the external charging of the power storage device again after the discharging of electric power from the power storage device in the second period ends.

Preferably, in the electric-motor vehicle, the controller permits the discharging of electric power from the power storage device until a state of charge (SOC) of the power storage device is lowered to a first value in the first period and permits the discharging of electric power from the power storage device until the SOC is lowered to a second value in the second period, and the first value is greater than the second value. More preferably, the second value is set on the basis of a history of information indicating an amount of electric power in the power storage device used in a predetermined operating period of the electric-motor vehicle.

Preferably, in the electric-motor vehicle, the controller inhibits the discharging of electric power from the power storage device in the first period.

According to another aspect of the present invention, there is provided power equipment configured to give and receive electric power to and from an electric-motor vehicle having a power storage device mounted thereon, including: a power node that is used to give and receive electric power to and from the electric-motor vehicle; and a controller that controls charging and discharging of the power storage device with respect to the power equipment in a state where electric power is able to be given and received between the power equipment and the electric-motor vehicle via the power node by charging and discharging of the power storage device. The controller controls discharging of electric power from the power storage device to the power equipment so as to provide a first period in which the discharging of electric power from the power storage device to the power equipment is limited after the power storage device is externally charged and a second period in which the discharging limitation in the first period is released at least after the first period ends.

Preferably, in the power equipment, the controller sets the first period to a period from a time point at which the external charging of the power storage device ends to a time point at which a predetermined period of time elapses thereafter and sets the second period to a period after the predetermined period of time elapses.

Preferably, in the power equipment, the controller controls the external charging on the basis of a charging end time designated by a user, sets the first period to a period from the charging end time to a time point at which the predetermined period of time elapses thereafter, and sets the second period to a period after the predetermined period of time elapses.

Alternatively, preferably, in the power equipment, the controller causes a user to ascertain whether to discharge electric power from the power storage device when a discharging request is given to the power storage device in the second period. More preferably, the controller causes a user to ascertain whether to perform the external charging of the power storage device again after the discharging of electric power from the power storage device in the second period ends.

Preferably, in the power equipment, the controller permits the discharging of electric power from the power storage device until a state of charge (SOC) of the power storage device is lowered to a first value in the first period and permits the discharging of electric power from the power storage device until the SOC is lowered to a second value in the second period, and the first value is greater than the second value. More preferably, the second value is set on the basis of a history of information indicating an amount of electric power in the power storage device used in a predetermined operating period of the electric-motor vehicle.

Preferably, in the power equipment, the controller inhibits the discharging of electric power from the power storage device in the first period.

According to still another aspect of the present invention, there is provided a power supply system including: an electric-motor vehicle that has a power storage device mounted thereon; power equipment configured to give and receive electric power to and from the electric-motor vehicle; and a controller that controls charging and discharging of the power storage device in a state where electric power is able to be given and received between the power equipment and the electric-motor vehicle by charging and discharging of the power storage device. The controller controls discharging of electric power from the power storage device to the power equipment so as to provide a first period in which the discharging of electric power from the power storage device to the power equipment is limited after the power storage device is externally charged with electric power from the power equipment and a second period in which the discharging limitation in the first period is released at least after the first period ends.

Preferably, in the power supply system, the controller sets the first period to a period from a time point at which the external charging of the power storage device ends to a time point at which a predetermined period of time elapses thereafter and sets the second period to a period after the predetermined period of time elapses.

Preferably, in the power supply system, the controller controls the external charging on the basis of a charging end time designated by a user, sets the first period to a period from the charging end time to a time point at which the predetermined period of time elapses thereafter, and sets the second period to a period after the predetermined period of time elapses.

Alternatively, preferably, in the power supply system, the controller is disposed in the power equipment. The controller causes a user to ascertain whether to discharge electric power from the power storage device in the second period and requests the electric-motor vehicle for discharging of electric power from the power storage device when the user permits the discharging of electric power from the power storage device. More preferably, the controller causes a user to ascertain whether to perform the external charging of the power storage device again after the discharging of electric power from the power storage device in the second period ends.

Preferably, in the power supply system, the controller permits the discharging of electric power from the power storage device until a state of charge (SOC) of the power storage device is lowered to a first value in the first period and permits the discharging of electric power from the power storage device until the SOC is lowered to a second value in the second period, and the first value is greater than the second value. More preferably, the second value is set on the basis of a history of information indicating an amount of electric power in the power storage device used in a predetermined operating period of the electric-motor vehicle.

Alternatively, preferably, in the power supply system, the controller inhibits the discharging of electric power from the power storage device in the first period.

Preferably, in the power supply system, the electric-motor vehicle and the power equipment are electrically connected to each other with a cable.

Effects of the Invention

According to the present invention, it is possible to appropriately control charging and discharging of an onboard power storage device with respect to the outside of a vehicle in an electric-motor vehicle configured to give and receive electric power to and from the outside of the vehicle.

BRIEF DESCRIPTION OF THE DRAWINGS

FIG. 9 is a flowchart illustrating a first example of a discharging control of an onboard power storage device according to Modification Example 2 of the embodiment.

FIG. 10 is a flowchart illustrating a second example of the discharging control of the onboard power storage device according to Modification Example 2 of the embodiment.

MODES FOR CARRYING OUT THE INVENTION

Figure 1:
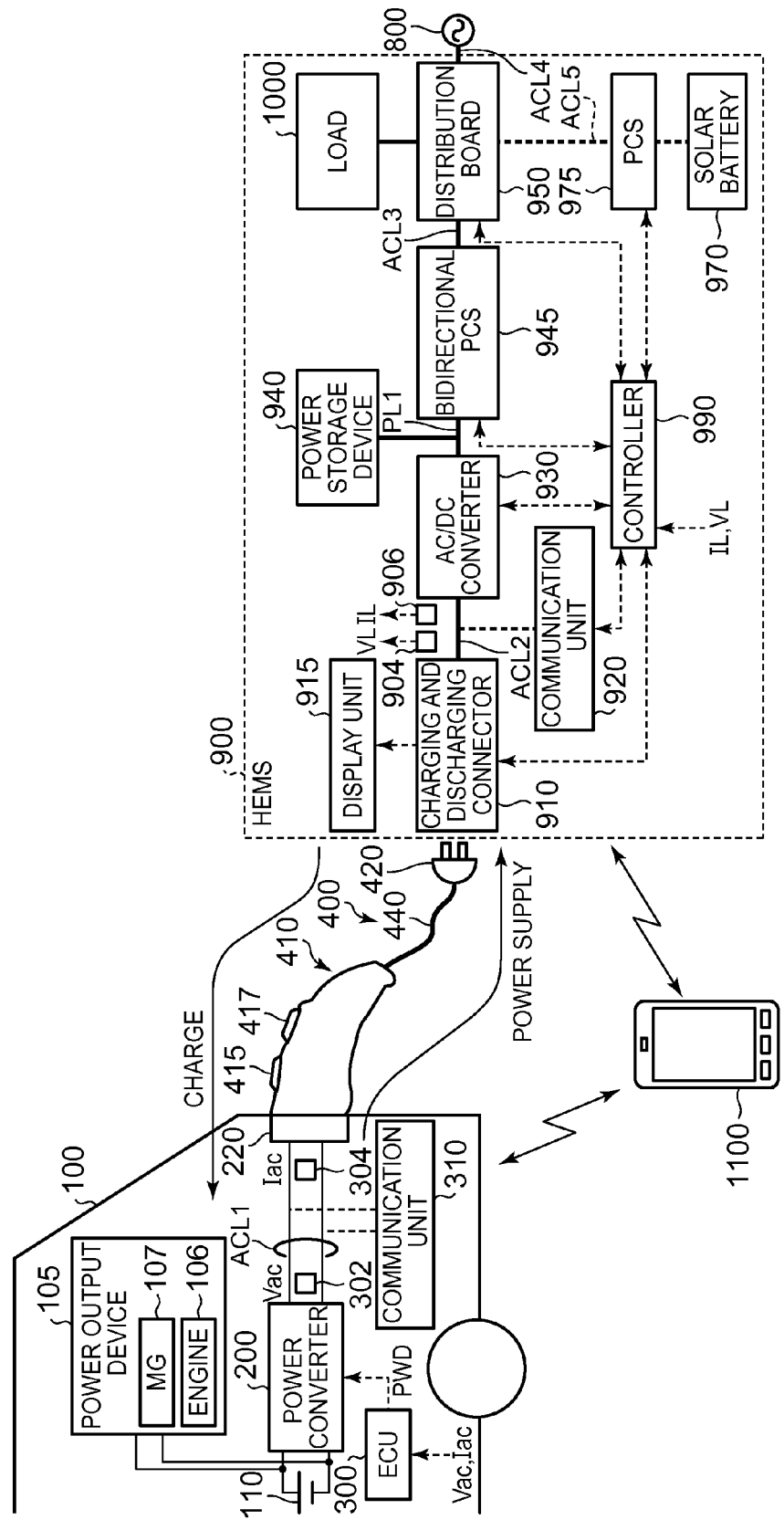
FIG. 1 is a block diagram schematically illustrating a configuration example of a power supply system according to an embodiment of the present invention.

Hereinafter, embodiments of the present invention will be described in detail with reference to the accompanying drawings. In the following description, identical or corresponding elements in the drawings will be referenced by the same reference signs and description thereof will not be repeated in principle.

(Embodiment 1)

FIG. 1 is a block diagram schematically illustrating a configuration example of a power supply system according to an embodiment of the present invention.

Referring to FIG. 1, the power supply system according to this embodiment includes a vehicle 100 and power equipment 900. In FIG. 1, the vehicle 100 is configured to be electrically connected to the power equipment 900 outside the vehicle by attachment of a cable 400.

The vehicle 100 is an "electric-motor vehicle" that can travel with electric power from an onboard power storage device. Examples of the vehicle 100 include a hybrid automobile, an electric automobile, and a fuel-cell automobile. In the following description, a hybrid automobile, particularly, a so-called plug-in hybrid automobile, in which a power storage device 110 can be charged with an external power supply is exemplified as the vehicle 100. The external power source representatively includes a commercial system power supply 800.

The vehicle 100 includes a dynamic power output device 105, the onboard power storage device 110, an electronic control unit (ECU) 300 as a controller, and a communication unit 310.

The power storage device 110 is a power storage element configured to be rechargeable. The power storage device 110 includes a secondary battery such as a lithium-ion battery and a nickel-hydrogen battery or a storage element such as an electrical double-layer capacitor.

The dynamic power output device 105 generates a driving force of the vehicle 100 on the basis of a drive command from the ECU 300. The driving force generated from the dynamic power output device 105 is transmitted to driving wheels of the vehicle 100. The drive command is a control command generated on the basis of a requested vehicle driving force or a requested vehicle braking force during traveling of the vehicle 100.

In the hybrid vehicle, the dynamic power output device 105 includes an engine 106 and a motor generator 107. For example, the dynamic power output device 105 is configured to output one or both of the outputs of the engine 106 and the motor generator 107 to the driving wheels. The dynamic power output device 105 includes a power converter (not illustrated) that converts the output power of the power storage device 110 into electric power for controlling the output torque of the motor generator 107.

In the hybrid vehicle, the dynamic power output device 105 is generally configured to include a power generator and a power converter (inverter) (not illustrated) for generating charging power of the power storage device 110 with the output of the engine 106. When the vehicle 100 is an electric automobile, the arrangement of the engine 106 is skipped and the dynamic power output device 105 generates the driving force of the vehicle 100 from the output of the motor generator 107.

The ECU 300 includes a central processing unit (CPU), a storage device, and an input and output buffer, receives signals from various sensors and the like, outputs control signals to respective units, and controls the power storage device 110 and the units of the vehicle 100. These controls are not limited to software processes but may be performed by dedicated hardware (electronic circuits).

The ECU 300 is configured to comprehensively control onboard devices in various operation modes of the vehicle 100. For example, in a travel mode in which the vehicle 100 travels, the ECU 300 calculates a vehicle driving force and a vehicle braking force required for the whole vehicle 100 on the basis of a vehicle state or a driver's operation (such as a degree of stepping on an accelerator pedal, a position of a shift lever, and a degree of stepping on a brake pedal) of a vehicle 100. Then, the ECU 300 generates a drive command of the dynamic power output device 105 so as to realize the required vehicle driving force or the required vehicle braking force. The ECU 300 is configured to compute a state of charge of the power storage device 110 on the basis of detected values of a voltage and a current from the power storage device 110.

A configuration for giving and receiving electric power between the vehicle 100 and the outside of the vehicle 100 (representatively, the power equipment 900) will be described below.

The vehicle 100 has an operation mode (hereinafter, referred to as "charging mode") in which the power storage device 110 is charged with an external power supply and an operation mode (hereinafter, referred to as "power supply mode") in which electric power discharged from the power storage device 110 is converted into AC power and is output to the outside, as the operation modes in which electric power is given and received to and from the outside of the vehicle. Accordingly, the vehicle 100 can be externally charged with the external power supply and the electric power from the power storage device 110 can be supplied to a load outside the vehicle. That is, as in a smart grid, a power supply system using the vehicle 100 as a power supply source can be constituted.

In the configuration example illustrated in FIG. 1, the vehicle 100 is connected to the power equipment 900 outside the vehicle with a cable 400. When the cable 400 is normally connected to the vehicle 100 and the power equipment 900, electric power can be given and received between the vehicle 100 and the power equipment 900.

The cable 400 includes a connector 410, a plug 420, and a power line 440 that connects the connector 410 and the plug 420.

The connector 410 is provided with an operation unit 415 and a switch 417. The operation unit 415 is operated by a user when detaching the connector 410 from the inlet 220. Specifically, by causing the user to press the operation unit 415, a fitting state between a fitting portion (not illustrated) of the connector 410 and the inlet 220 is released.

The switch 417 is a switch for forcibly selecting the power supply mode or the charging mode. The user can select one mode of the power supply mode and the charging mode and can avoid automatic performing the other mode by operating the switch 417. On the other hand, when the switch 417 is not operated, the power supply mode and the charging mode can be automatically selected. That is, when electric power can be given and received between the vehicle 100 and the power equipment 900 by connection of the cable 400, the charging mode and the discharging mode can be automatically started in accordance with a request from the vehicle side (the ECU 300) or an HEMS side (the controller 990). As can be apparently seen from the following description, this embodiment is directed to a charging and discharging control of the onboard power storage device when the switch 417 is not operated.

The vehicle 100 includes a power converter 200, an inlet 220, and a power line ACL1 as a configuration for the charging mode and the power supply mode. The inlet 220 corresponds to a "power node" for giving and receiving electric power to and from the outside of the vehicle. The power converter 200 is configured to perform bidirectional power conversion between a DC voltage of the power storage device 110 and an AC voltage of the power line ACL1.

The communication unit 310 is configured to transmit and receive information to and from the outside of the vehicle 100, that is, at least the power equipment 900. The communication unit 310 may be configured to perform communication in a wireless manner or may be configured to perform power line communication via the cable 400.

In the charging mode of the vehicle 100, the power converter 200 operates to convert an AC voltage supplied to the power line ACL1 via the cable 400 and the inlet 220 into a DC voltage for charging the power storage device 110. Accordingly, the onboard power storage device 110 can be charged with the electric power from an external power supply.

On the other hand, in the power supply mode of the vehicle 100, the power converter 200 operates to convert a DC voltage based on the discharging of electric power from the power storage device 110 into an AC voltage and to output the AC voltage to the power line ACL1. The AC voltage is supplied to a load (the power equipment 900) outside the vehicle via the inlet 220 and the cable 400.

A voltage sensor 302 and a current sensor 304 are disposed in the power line ACL1. The voltage sensor 302 detects an effective value of an AC voltage Vac input and output to and from the power converter 200. Similarly, the current sensor 304 detects an effective value of an AC current Iac input and output to and from the power converter 200.

In this way, in the configuration example illustrated in FIG. 1, the power converter 200 is shared by the charging mode and the power supply mode. Alternatively, unlike the configuration example illustrated in FIG. 1, a power converter for the charging mode and a power converter for the power supply mode may be individually provided. In this case, the power converter 200 for the power supply mode performs power conversion from DC power to AC power. In parallel with the power converter 200, a separate power converter (not illustrated) for performing power conversion from AC power to DC power is disposed between the power storage device 110 and the inlet 220.

The configuration of the power equipment 900 will be described below.

The power equipment 900 is representatively constituted by an energy management system such as a home energy management system (HEMS). Accordingly, the power equipment 900 is hereinafter also referred to as an HEMS 900.

The HEMS 900 includes a charging and discharging connector 910, a display unit 915, a communication unit 920, an AC/DC converter 930, a power storage device 940, a bidirectional power conditioning subsystem (PCS) 945, a distribution board 950, and a controller 990.

Electric power is supplied to a socket not illustrated from the distribution board 950 and a load 1000 can operate with AC power supplied from the distribution board 950 by connection to the socket. Representatively, the load 1000 corresponds to electrical appliances used in home.

The charging and discharging connector 910 is electrically connected to the inlet 220 of the vehicle 100 by connection to the plug 420 of the cable 400. The charging and discharging connector 910 and the AC/DC converter 930 are connected to each other via a power line ACL2.

The AC/DC converter 930 performs bidirectional AC/DC conversion between the power line ACL2 supplied with an AC voltage and a power line PL1 supplied with a DC voltage. The power line PL1 is connected to the power storage device 940.

The bidirectional PCS 945 is connected between the power line PL1 and a power line ACL3 supplied with AC power. The bidirectional PCS 945 can bidirectionally perform power conversion of converting the DC power of the power line PL1 into AC power linked to the commercial system power supply 800 and outputting the AC power to the power line ACL3 and power conversion of converting the AC power of the power line ACL3 into DC power for charging the power storage device 940 and outputting the DC power to the power line PL1. The bidirectional PCS 945 and the distribution board 950 are electrically connected to each other via the power line ACL3.

The distribution board 950 is connected to the commercial system power supply 800 via a power line ACL4. In the configuration example illustrated in FIG. 1, the distribution board 950 may be further connected to a solar cell 970 and a PCS 975 via a power line ACL5. The PCS 975 converts DC power generated by the solar cell 970 into AC power linked with the AC power from the commercial system power supply 800 and outputs the AC power to the power line ACL5.

Alternatively, instead of the solar cell 970 or in addition to the solar cell 970, a fuel cell or the like may be provided as a power source. In this way, an arbitrary power source such as the commercial system power supply 800 may be provided as a power source other than the vehicle 100.

The controller 990 comprehensively controls various units in the HEMS 900. The communication unit 920 is configured to transmit and receive information to and from at least the communication unit 310 of the vehicle 100. The communication unit 920 may be configured to perform wireless communication or may be configured to perform power line communication via the cable 400. Accordingly, data, a control command, or the like can be transmitted from the vehicle 100 to the HEMS 900. In contrast, data, a control command, or the like can be transmitted from the HEMS 900 to the vehicle 100.

The display unit 915 is disposed in the charging and discharging connector 910 and can visually display information on charging and discharging of the HEMS 900 in accordance with an instruction from the controller 990. By forming the display unit 915 out of a touch panel, an instruction from a user may be input.

In the power supply mode of the vehicle 100, an AC voltage from the vehicle 100 is input to the charging and discharging connector 910 via the cable 400. The AC/DC converter 930 converts the AC voltage transmitted to the power line ACL2 via the charging and discharging connector 910 into a DC voltage for charging the power storage device 940 and outputs the DC voltage to the power line PL1. In the power supply mode of the vehicle 100, the bidirectional PCS 945 converts the DC power of the power line PL1 into the AC power linked with the commercial system power supply 800 and outputs the AC power to the power line ACL3.

In this way, in the power supply mode of the vehicle 100, the AC voltage input to the charging and discharging connector 910 is temporarily converted into the DC voltage for charging the power storage device 940. The DC power is supplied from the distribution board 950 to the load 1000 through the power conversion in the bidirectional PCS 945.

In the power supply mode of the vehicle 100, electric power from a power source other than the vehicle 100 may be supplied from the distribution board 950 to the load 1000. In the power supply mode, at least a part of power consumption of the load 1000 can be provided with electric power discharged from the power storage device 110 of the vehicle 100.

Accordingly, the controller 990 controls power distribution between the power supplies in comprehensive consideration of energy efficiency or costs in the whole HEMS 900 on the basis of the power consumption in the load 1000, the electric power generated by the solar cell 970, and an amount of power purchased from the commercial system power supply 800 or a price of each time zone. As part of the power distribution control, the controller 990 requests the vehicle 100 for supplying electric power of the power storage device 110. Accordingly, the HEMS 900 (controller 990) gives a discharging request to the vehicle 100 (ECU 300).

The power line ACL2 is provided with a voltage sensor 904 and a current sensor 906. The voltage sensor 904 measures an effective value of an AC voltage VL (hereinafter, simply referred to as input voltage VL) input from the vehicle 100 to the charging and discharging connector 910. Similarly, the current sensor 906 detects an effective value of an AC current IL (hereinafter, simply referred to as input current IL) input from the vehicle 100 to the charging and discharging connector 910.

On the other hand, in the charging mode of the vehicle 100, the HEMS 900 can output an AC voltage with electric power from another power source such as the commercial system power supply 800 as a source to the charging and discharging connector 910 by performing power conversion in the direction opposite to that in the power supply mode. Accordingly, in the charging mode, an AC voltage can be supplied to the inlet 220 of the vehicle 100 via the cable 400.

Alternatively, although not illustrated, a power path (not illustrated) may be selectively formed between the commercial system power supply 800 and the charging and discharging connector 910. Even in this configuration, it is possible to cope with the charging mode of the vehicle 100 by connecting the plug 420 of the cable 400 to the charging and discharging connector 910 of the HEMS 900.

The communication units 310 and 920 are configured to transmit and receive information to and from the outside of the vehicle 100 and the HEMS 900, for example, a portable information terminal 1100 such as a smart phone. Accordingly, in the power supply system according to this embodiment, an instruction from a user can be input through the use of the portable information terminal 1100 in addition to the input element such as the touch panels disposed in the vehicle 100 and/or the HEMS 900.

In the power supply system illustrated in FIG. 1, the vehicle 100 and the power equipment 900 can give and receive electric power to and from each other through charging and discharging of the power storage device 110 by connection of the cable 400. In this state, when the charging mode is selected, the power storage device 110 is externally charged by a user's manual operation (switching-on operation) or by an automatic process based on a charging instruction input from the user.

In the configuration example illustrated in FIG. 1, since information can be transmitted between the vehicle 100 and the HEMS 900 by the use of the communication units 310 and 920, an instruction related to the charging and discharging of the power storage device 110 may be input to any of the vehicle 100 and the HEMS 900. In a state where the cable 400 is connected, an instruction from the user may be input to an input element disposed in the connector 410.

When the user instructs to start the external charging, the power storage device 110 is charged to a predetermined SOC (for example, a full level or an SOC level corresponding to an amount of power to be charged designated by the user) and then the charging mode ends.

As an aspect of the external charging using the automatic process, so-called timer charging in which the user designates a charging end time may be performed. For example, when the user designates the charging end time to correspond to a time point at which the user starts driving of the vehicle 100, the power storage device 110 is charged in accordance with a charging schedule inversely calculated from the necessary amount of power to be charged. Accordingly, the charging of the power storage device 110 can be completed at the designated charging end time. A power price for each time zone may be reflected in the charging schedule. Alternatively, in order to prevent degradation of the power storage device 110, the charging schedule may be calculated so as not to consecutively maintain a high SOC state (particular, a high SOC state under a high temperature).

When the state where electric power can be given and received between the vehicle 100 and the power equipment 900 by the charging and discharging of the power storage device 110 is maintained by connection of the cable 400 even after the charging mode of the vehicle 100 ends, a discharging mode in which electric power is supplied to the power equipment 900 can be executed using the electric power stored in the power storage device 110.

However, when the discharging mode is permitted without any limitation after the charging mode ends, the SOC at the time of start of driving the vehicle 100 is lowered and a travel distance using electric power may not be secured. On the other hand, when execution of the discharging mode is completely inhibited, power utilization in the power supply system is lowered and there is a possibility that degradation due to maintenance of the high SOC state in a long term will be caused to progress.

In this way, in the power supply system illustrated in FIG. 1, how to control discharging of electric power from the power storage device 110 is important after the charging of the power storage device 110 in the charging mode ends.

Figure 2:
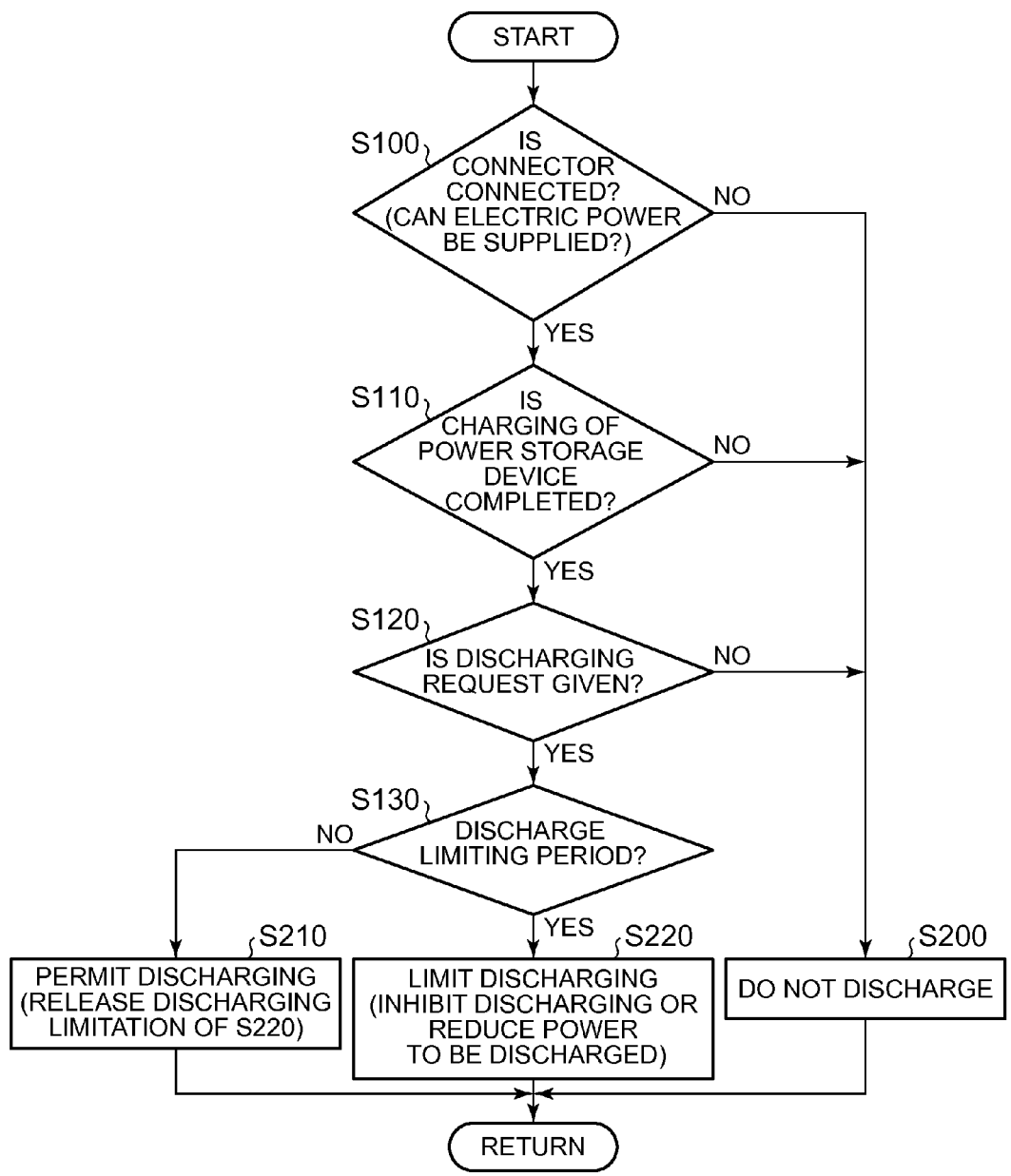
FIG. 2 is a first flowchart illustrating a first example of a discharging control of an onboard power storage device in the power supply system according to the embodiment of the present invention.

FIG. 2 is a flowchart illustrating a first example of the discharging control of the onboard power storage device in the power supply system according to the embodiment of the present invention. FIG. 2 illustrates an example in which the discharging is controlled by the ECU 300 of the vehicle 100. The control process illustrated in FIG. 2 is repeatedly performed with a predetermined period when the vehicle does not travel and the discharging mode is not started.

Referring to FIG. 2, in step S100, the ECU 300 determines whether the cable 400 is connected, that is, whether electric power can be given and received between the vehicle 100 and the power equipment 900 by the charging and discharging of the power storage device 110. For example, the determination of step S100 can be performed on the basis of an electrical signal transmitted from the connector 410. In this case, when the fitting portion of the connector 410 is normally fitted to the inlet 220, the electrical signal can be output from a circuit built in the connector 410 to the vehicle 100.

Alternatively, the inlet 220 may be provided with a link mechanism configured to operate when the fitting portion of the connector 410 is normally fitted to the inlet 220. In this case, the determination of step S100 can be performed on the basis of the output of the link mechanism.

When it is determined that the cable 400 is not normally connected (NO in step S100), the ECU 300 does not start the discharging of electric power from the power storage device 110 in step S200.

When it is determined that the cable 400 is normally connected (YES in step S100), the ECU 300 determines whether the charging of the power storage device 110 is completed in step S110. The determination result of step S110 is NO during execution of the charging mode regardless of the SOC of the power storage device 110.

In a non-charging mode, the determination of step S110 is performed on the basis of the SOC of the power storage device 110. For example, by comparing the current SOC with a determination threshold value, the determination result of step S110 is YES when the power storage device 110 is charged to a predetermined level (for example, a full level) in the charging mode. Alternatively, the determination threshold value of the SOC is set so that the determination result of step S110 is YES in a high SOC region in which the degradation of the power storage device 110 progresses even when the SOC is lower than the full level. Accordingly, the determination condition of step S110 may be set to be variable so as to lower the determination threshold value of the SOC in a high-temperature state depending on the temperature characteristics of the power storage device 110.

When it is determined that the power storage device is not fully charged (NO in step S110), the ECU 300 does not start discharging of electric power from the power storage device 110 in step S200.

When it is determined that the power storage device is fully charged (YES in step S110), the ECU 300 checks whether a discharging request is given from the HEMS 900 in step S120. When it is determined that a discharging request is not given from the HEMS 900 (NO in step S120), the ECU 300 does not start discharging of electric power from the power storage device 110 in step S200.

When it is determined that a discharging request is given from the HEMS 900 (YES in step S120), the ECU 300 determines whether the current time is in a discharge limiting period in step S130. When it is determined that the current time is not in the discharge limiting period (NO in step S130), the ECU 300 permits discharging of electric power from the power storage device 110 in step S210. Accordingly, a normal discharging control is started. When the discharging control is started, the ECU 300 controls the power storage device 110 so as to discharge electric power within a power range based on the state (SOC, temperature, and the like) of the power storage device 110 and/or capability of the power converter 200.

On the other hand, when it is determined that the current time is in the discharge limiting period (YES in step S130), the ECU 300 limits discharging of electric power from the power storage device 110 in step S220. In the discharge limiting period, representatively, the discharging of electric power is limited by stopping the power converter 200 to inhibit the discharging of electric power from the power storage device 110. Alternatively, the discharging may be limited by lowering the electric power output from the power converter 200 more than that in the normal discharging control of step S210. In this way, the "discharging limitation" in this embodiment is a concept including both of the inhibition of the discharging and the decrease of the discharged electric power. On the other hand, when the discharging is permitted in step S210, the discharging limitation of step S220 is not performed. That is, it will be understood that the discharging limitation is released.

The decrease of the discharged electric power can be achieved by directly controlling the output power (current) output from the power converter 200, or the electric power discharged from the power storage device 110 may be decreased to a level lower than that in a normal mode (no discharging limitation) by a power distribution control in the HEMS 900. In this case, the controller 990 performs the power distribution control so that the ratio of electric power supplied from a power source other than the vehicle 100 to the electric power supplied form the distribution board 950 to the load 1000 becomes higher than that in the normal mode (no discharging limitation).

When the discharging of electric power from the power storage device 110 is started in step S210 (normal permission of discharging) or step S220 (permission of discharging with decreased electric power to be discharged), the discharging of electric power from the power storage device 110 is continuously performed until the discharging is not requested by the HEMS 900 or until the power storage device 110 cannot discharge electric power. The control process illustrated in FIG. 2 is not performed during the discharging of electric power, and the control process illustrated in FIG. 2 is performed again with a predetermined period when the discharging ends.

Setting of the discharge limiting period will be described below with reference to FIGS. 3 to 5.

Figure 3:
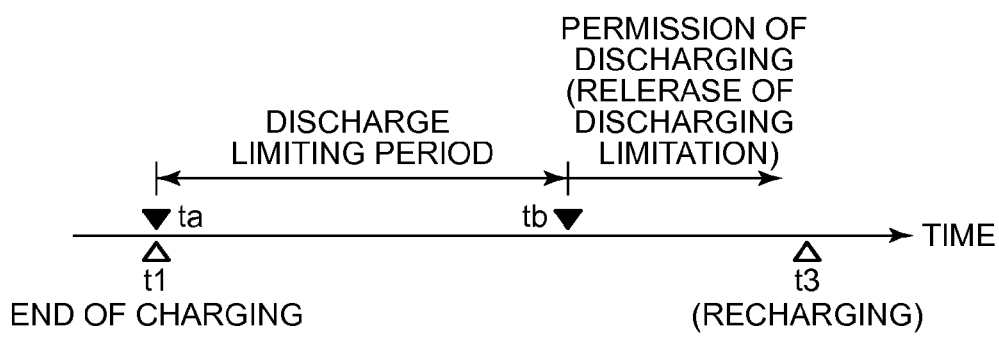
FIG. 3 is a conceptual diagram illustrating a first setting example of a discharge limiting period.

Referring to FIG. 3, the charging of the power storage device 110 is completed at time t1. After the charging ends (after time t1), a period from time ta to time tb is set as the discharge limiting period to correspond to a period in which there is a possibility that the user will use the vehicle 100. Representatively, the discharge limiting period can be set by causing the user to input the start time ta and the end time tb. Alternatively, the ECU 300 or the controller 990 may automatically set the times ta, tb by predicting a period in which there is a possibility that the user will use the vehicle 100 on the basis of the use history of the vehicle 100 by the user, for example, the history up to now of the driving start time of the vehicle 100.

Figure 4:
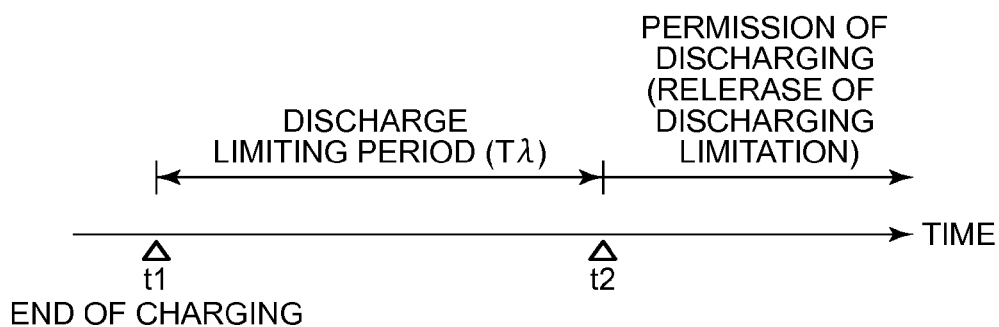
FIG. 4 is a conceptual diagram illustrating a second setting example of the discharge limiting period.

Alternatively, as illustrated in FIG. 4, instead of setting the start time and the end time of the discharge limiting period, the discharge limiting period may be set to a period until a predetermined period of time Tλ elapses after the charging end time. In this case, the length (Tλ) of the discharge limiting period is set on the basis of an input from the user or the use history of the vehicle up to now. In the example illustrated in FIG. 4, the discharging of electric power from the power storage device 110 is limited in step S220 (FIG. 2) from time t1 to time t2 at which the predetermined period of time Tλ elapses after the charging end time (time t1).

Particularly, when the external charging is performed by timer charging, there is a high possibility that the charging end time t1 designated by the user is determined to correspond to the time at which the user starts driving the vehicle 100. Accordingly, as illustrated in FIG. 4, correspondence between the period in which there is a possibility that the user will use the vehicle 100 and the discharge limiting period can be enhanced by setting the discharge limiting period to the period until a predetermined period of time elapses after the charging end time.

In FIGS. 3 and 4, the discharging limitation of step S220 is released in a period after time tb (FIG. 3) or time t2 (FIG. 4) at which the discharge limiting period ends. That is, the discharging of electric power from the power storage device 110 is permitted in step S210 (FIG. 2). The vehicle 100 can be satisfactorily utilized as a power supply source by the supply of electric power to the HEMS 900 due to the discharging of electric power from the power storage device 110 of which the discharging limitation is released. By using the electric power from the power storage device 110, it is possible to prevent the power storage device 110 from being left in a high SOC state in a long term. In this way, the "discharge limiting period" corresponds to the "first period" and the period in which the discharging limitation is released after the discharge limiting period ends corresponds to the "second period".

Figure 5:
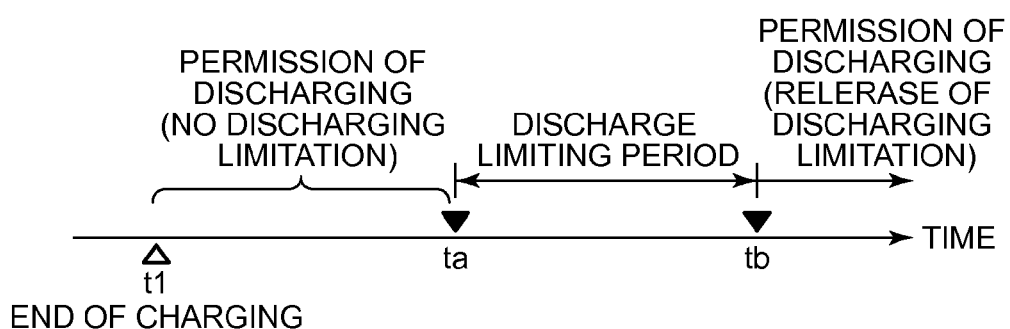
FIG. 5 is a conceptual diagram illustrating a third setting example of the discharge limiting period.

FIGS. 3 and 4 illustrate an example where the discharge limiting period is started from the charging end time t1, but the discharge limiting period may be provided so that the period in which the discharging limitation is released after the charging of the power storage device 110 ends is present as illustrated in FIG. 5.

Referring to FIG. 5, in an aspect in which the start time ta of the discharge limiting period is disposed after the discharging is permitted in a predetermined period after the charging end time t1, the period from time ta to time tb may be set as the discharge limiting period. In this case, similarly to the period from time t1 to time ta, the discharging of electric power from the power storage device 110 of which the discharging limitation has been released is permitted in the period after the discharge limiting period ends in step S210 (FIG. 2).

When the discharging of electric power form the power storage device 110 is permitted after the discharge limiting period illustrated in FIGS. 3 to 5 ends, the SOC of the power storage device 110 is lowered by the supply of electric power to the HEMS 900. Accordingly, after the discharging of electric power from the power storage device 110 is performed (for example, time t3 in FIG. 3), it is preferable that the charging mode be applied again to the vehicle 100 to recharge the power storage device 110.

More specifically, regarding the recharging of the power storage device 110, the recharging of the power storage device 110 can be performed for every predetermined time, in consideration of the power price for each time zone, or the like. By this recharging, it is possible to enhance secureness of the SOC when the user starts the driving of the vehicle 100. By permitting the discharging of electric power from the power storage device 110 after the recharging ends, it is possible to prevent degradation of the power storage device 110 due to continuation of the high SOC state and to secure utilization of power stored in the power storage device 110. By providing the discharge limiting period even after the recharging as illustrated in FIGS. 3 to 5, it is possible to further enhance secureness of the SOC when starting the driving of the vehicle 100. The user may be requested to ascertain whether to recharge the power storage device 110, the discharging of electric power from the power storage device may be controlled so that the recharging is performed only when the user requests for the recharging.

FIG. 2 illustrates the control process of causing the vehicle 100 side (the ECU 330) to control the discharging of the onboard power storage device 110, but the equivalent control process can be realized by causing the HEMS 900 side (the controller 990) to control issuance of a discharging request.

Figure 6:
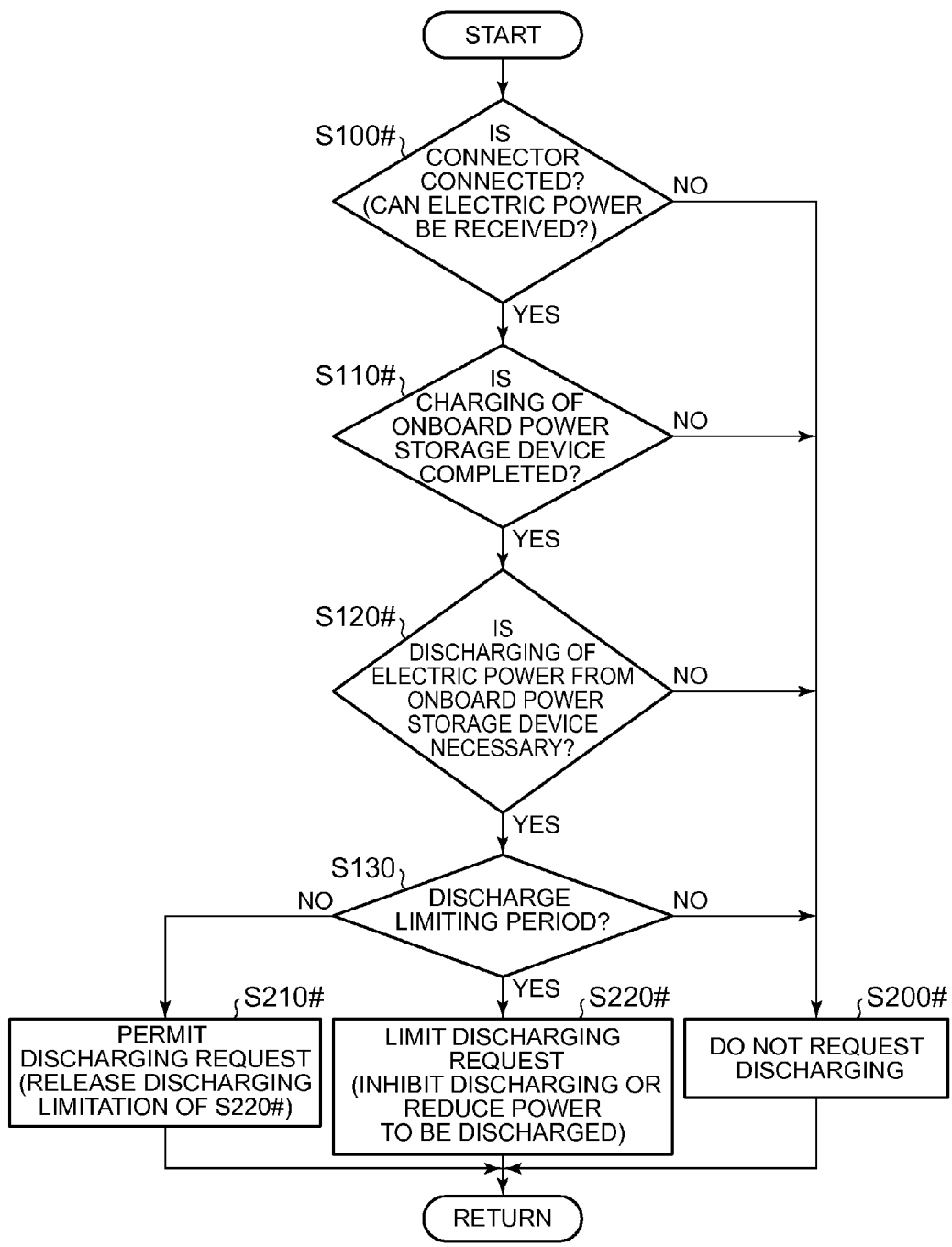
FIG. 6 is a flowchart illustrating a second example of the discharging control of the onboard power storage device in the power supply system according to the embodiment of the present invention.

FIG. 6 is a flowchart illustrating a second example of the discharging control of the onboard power storage device in the power supply system according to the embodiment of the present invention. FIG. 6 illustrates an example where the discharging is controlled by the controller 990 of the HEMS 900. The control process illustrated in FIG. 6 is repeatedly performed with a predetermined period when the vehicle does not travel and the discharging mode is not started, similarly to FIG. 2.

Referring to FIG. 6, the controller 990 determines whether the cable 400 is connected in step S100# which is the same as step S100 of FIG. 2. Accordingly, it is determined whether electric power can be given and received between the vehicle 100 and the power equipment 900 by the charging and discharging of the power storage device 110.

The controller 990 determines whether charging of the power storage device 110 of the vehicle 100 is completed in step S110#. The determination of step S110# can be performed, similarly to step S110 of FIG. 2, on the basis of information transmitted between the controller 990 and the ECU 300 via the communication units 310 and 920.

When the determination result of at least one of steps S100# and S110# is NO, the controller 990 does not issue a discharging request to the onboard power storage device 110 in step S200#.

On the other hand, when the determination results of both of steps S100# and S110# are YES, the controller 990 performs the process of step S120#. In step S120#, the controller 990 determines whether discharging of electric power from the onboard power storage device 110 is necessary under the power distribution control in the HEMS 900. When it is determined the discharging of electric power from the onboard power storage device 110 is not necessary (NO in step S120#), the controller 990 does not give the discharging request to the onboard power storage device 110 in step S200#.

When it is determined that the discharging of electric power from the onboard power storage device 110 (YES in step S120#), the controller 990 determines whether the current time is in the discharge limiting period in step S130 which is the same as in FIG. 2. The discharge limiting period is set in the same way as described with reference to FIGS. 3 to 5.

When it is determined that the current time in the discharge limiting period (YES in step S130), the controller 990 limits the discharging request to the power storage device 110 in step S220#. In step S220#, in comparison with the discharging request in step S210#, the discharging request is issued so as to inhibit the discharging of electric power from the power storage device 110 or to decrease the electric power to be discharged. When the discharging of electric power from the power storage device 110 is inhibited, the discharging request to the onboard power storage device 110 may not be issued, similarly to step S200#.

On the other hand, when it is determined that the current time is not in the discharge limiting period (NO in step S130), the controller 990 permits issuance of the discharging request to the power storage device 110 in step S210#. By transmitting the issued discharging request to the vehicle 100, the discharging of electric power from the power storage device 110 to the HEMS 900 is controlled under the same normal discharging control as in step S210 of FIG. 2. That is, in the discharging request in step S210#, the limitation of the discharging request in step S220# is released.

As illustrated in the flowchart of FIG. 6, the discharging of electric power from the onboard power storage device 110 in the power supply system can also be controlled, similarly to FIG. 2, by the control process in the controller 990.

In this way, in the power supply system according to this embodiment, a predetermined discharge limiting period is provided to correspond to a period in which there is a possibility that the user will use the vehicle 100 after the power storage device 110 of the vehicle 100 is externally charged, and the discharging of electric power from the power storage device 110 of which the discharging limitation is released can be permitted after the discharge limiting period ends. Representatively, by limiting the discharging of electric power in a predetermined period from the charging end time (particularly, at the time of timer charging), it is possible to simply determine the discharge limiting period corresponding to a period in which there is a possibility that the user will use the vehicle 100.

Accordingly, it is possible to secure the SOC when, a user starts driving of the vehicle 100 and to prevent long-term maintenance of the high SOC state and a decrease in utilization of electric power stored in the onboard power storage device 110 by not excessively limiting the discharging of electric power.

As a result, it is possible to appropriately control the charging and discharging of the onboard power storage device 110 with respect to the outside (the HEMS 900) of the vehicle so as to satisfy prevention of degradation of the power storage device 110 due to long-term continuation of the high SOC state, improvement in utilization of the vehicle 100 as the power supply source, and secureness of the SOC at the time of start of driving the vehicle 100. Particularly, by utilizing the vehicle as a power supply source, it is possible to improve energy efficiency or energy costs of the power supply system as a whole.

When the SOC of the power storage device 110 is lowered after the discharge limiting period ends, it is possible to enhance secureness of the SOC at the time of start of driving the vehicle by recharging the power storage device 110 with an external power supply (the HEMS 900).

MODIFICATION EXAMPLE 1

Another example of the discharging limitation in steps S220, S220# will be described below with reference to FIGS. 7 and 8.

In step S220 of FIG. 2 and step S220# of FIG. 6, the discharging of electric power from the power storage device 110 is limited by the limitation of discharged electric power including discharging inhibition (discharged electric power=0). In Modification Example 1, the discharging limitation based on limitation of the amount of electric power that can be discharged will be described.

Figure 7:
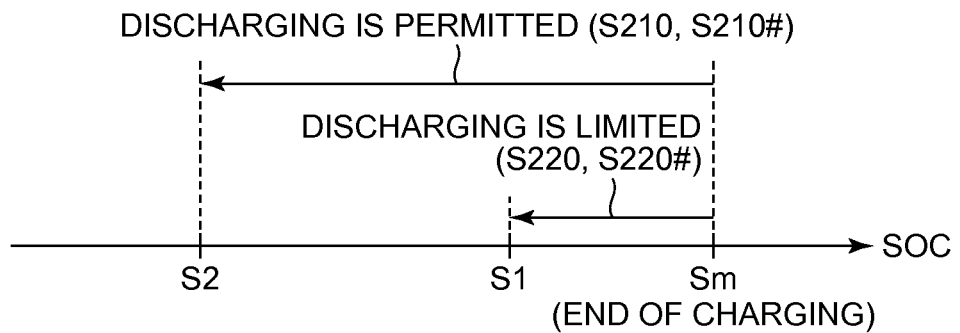
FIG. 7 is a conceptual diagram illustrating an example of discharging limitation according to Modification Example 1 of the embodiment.

FIG. 7 is a conceptual diagram illustrating an example of the discharging limitation according to Modification Example 1 of this embodiment.

Referring to FIG. 7, at the time of the charging end (time t1 in FIGS. 3 to 5), the SOC of the power storage device 110 is equal to Sm. At the time of the discharging permission in steps S210, S210#, that is, at the time of release of the discharging limitation, the SOC lower limit value in the discharging mode is set to S2. That is, the discharging of electric power from the power storage device 110 is permitted until the SOC is lowered from Sm to S2.

On the contrary, at the time of the discharging limitation in steps S220, S220#, the SOC lower limit value in the discharging mode is set to S1 (S1>S2). That is, the discharging of electric power from the power storage device 110 is permitted until the SOC is lowered from Sm to S1.

Accordingly, the amount of electric power corresponding to (Sm−S2) can be discharged from the power storage device 110 at the time of the discharging permission, and the amount of electric power that can be discharged is lowered at the time of the discharging limitation. That is, in Modification Example 1, the SOC when the user starts driving of the vehicle 100 can be secured to be greater than or equal to S1 in the discharge limiting period. Since the amount of electric power corresponding to (Sm−S1) can be supplied to the HEMS 900, the utilization of electric power stored in the power storage device can be secured to a certain extent.

In Modification Example 1, it is preferable that the SOC lower limit value S1 in the discharge limiting period be set to correspond to the SOC to be secured at the time of starting of driving the vehicle. For example, S1 can be appropriately set on the basis of the user's driving history of the vehicle 100. When the travel distance using electric power in a predetermined operating period of the vehicle 100 (an ON-OFF period of an ignition switch or a period from external charging to next external charging) is short and the amount of electric power used of the power storage device 110 is small, S1 can be set to be relatively low. On the other hand, when the amount of electric power of the power storage device 110 used in the predetermined operating period is large, it is preferable that S1 be set to be high.

Figure 8:
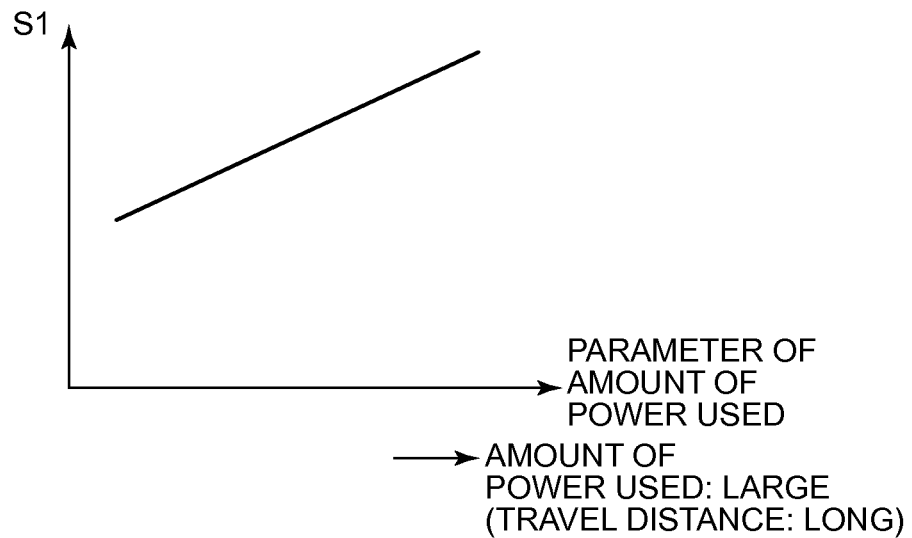
FIG. 8 is a conceptual diagram illustrating setting of an SOC lower limit value in the discharge limiting period.

Accordingly, as illustrated in FIG. 8, the SOC lower limit value S1 in the discharge limiting period can be set so that the larger the amount of electric power used becomes, the higher S1 becomes depending on a parameter indicating information on the amount of electric power of the power storage device 110 used in the predetermined operating period. The parameter may indicate the amount of electric power used (the SOC variation) of the power storage device 110 or may indicate the travel distance using the electric power. These parameters can be sequentially learned on the basis of the driving history of the vehicle 100 by the ECU 300.

In this way, according to Modification Example 1 of this embodiment, it is possible to cope with discharging limitation corresponding to a case where the SOC of the power storage device 110 is lowered to a certain extent by the discharging after the external charging but a sufficient amount of electric power can be secured at the time of starting of driving of the vehicle 100 such as a case where the capacity of the power storage device 110 is large.

At the time of application of the discharging limitation according to Modification Example 1, the electric power discharged from the power storage device 110 in the discharge limiting period (steps S220, S220#) may be set to be equivalent to the electric power discharged at the time of the normal discharging control (steps S210, S210#).

MODIFICATION EXAMPLE 2

In Modification Example 2 of this embodiment, a control process of causing the user to ascertain whether to discharge electric power from the onboard power storage device 110 in the discharge limiting period will be described.

FIG. 9 is a flowchart illustrating a first example of the discharging control of the onboard power storage device according to Modification Example 2 of this embodiment. Similarly to FIG. 2, FIG. 9 illustrates an example where the discharging of electric power is controlled by the ECU 300 of the vehicle 100. The control process illustrated in FIG. 9 is repeatedly performed with a predetermined period when the vehicle does not travel and the discharging mode is not started as in FIG. 2.

Comparing FIG. 9 with FIG. 2, in the control process of the ECU 300 according to Modification Example 2, the same processes of steps S100 to S130 as in FIG. 2 are performed. The processes of steps S100 to S130 are the same as in FIG. 2 and thus detailed description thereof will not be repeated. That is, when the determination result of step S130 is YES (in the discharge limiting period), the discharging of electric power from the power storage device 110 is limited in the same step S220 as in FIG. 2.

On the other hand, when the determination result of step S130 is NO (outside the discharge limiting period), the ECU 300 performs the processes of steps S140, S150. In step S140, the ECU 300 causes the user to ascertain whether to permit the discharging of electric power form the power storage device 110. Specifically, an ascertainment message is displayed on the display unit of the vehicle 100, the HEMS 900, or the portable information terminal 1100 to request the user for inputting the ascertainment result.

In step S150, the ECU 300 controls the discharging of electric power from the power storage device 110 depending on the ascertainment result input from the user in step S140. When the user does not permit the discharging (when the determination result of step S150 is NO), the ECU 300 limits the discharging of electric power from the power storage device 110 in step S220. At this time, the control process may be performed to request the user for designating limitation details (discharging inhibition, reduction of discharged electric power, or narrowing of a usable SOC range) in step S140.

On the other hand, when the user permits the discharging (when the determination result of step S150 is YES), the ECU 300 permits the discharging of electric power from the power storage device 110, of which the discharging limitation of step S220 is released, in the same step S210 as in FIG. 2.

Accordingly, the control process of automatically limiting the charging of electric power from the power storage device 110 in the discharge limiting period and permitting the discharging of electric power from the power storage device 110 after checking the user's intention outside the discharge limiting period is realized.

FIG. 10 is a flowchart illustrating a second example of a control operation in the discharging mode of the onboard power storage device according to Modification Example 2 of this embodiment. Similarly to FIG. 6, FIG. 10 illustrates an example where the discharging is controlled by the controller 990 of the HEMS 900. Similarly to FIG. 6, the control process illustrated in FIG. 10 is repeatedly performed with a predetermined period when the vehicle does not travel and the discharging mode is not started.

Comparing FIG. 10 with FIG. 6, in the discharging control of the power storage device according to Modification Example 2 of the embodiment, the controller 990 performs the same processes of steps S140, S150 as in FIG. 9 when the determination result of step S130 is NO (outside the discharge limiting period) after the same processes of steps S100# to S120# and step S130 as in FIG. 6 are performed. The processes of steps S100# to S120# and step S130 are the same as in FIG. 6 and thus detailed description thereof will not be repeated.

The controller 990 causes the user to ascertain whether to permit the discharging of electric power from the power storage device 110 in step S140, and controls the discharging of electric power from the power storage device 110 in step S150 depending on the user's ascertainment result in step S140.

When the user permits the discharging outside the discharge limiting period (when the determination result of step S150 is YES), the controller 990 permits issuance of a discharging request to the power storage device 110 of which the discharging limitation is released in the same step S210# as in FIG. 6.

On the other hand, when the current time is outside the discharge limiting period but the user does not permit the discharging (when the determination result of step S150 is NO), the controller 990 limits issuance of the discharging request to the power storage device 110 in the same step S220# as in FIG. 6. In this way, the discharging of electric power from the onboard power storage device 110 in the power supply system can also be controlled through the use of the control process by the controller 990 in the same way as illustrated in FIG. 9.

According to Modification Example 2 of this embodiment, it is possible to prevent the discharging of electric power from the power storage device 110 from being permitted against the user's intention. At the time of application of the discharging limitation according to Modification Example 2, when the discharging of electric power from the power storage device 110 is permitted in step S140, it is preferable that the user be requested to ascertain whether to recharge the power storage device 110 after the discharging. Then, it is possible to perform the recharging of the power storage device 110 in accordance with the user's intention.

FIGS. 9 and 10 illustrate the control process of causing the user to ascertain whether to perform the discharging in steps S140, S150 outside the discharge limiting period (when the determination result of step S130 is NO), but the processes of steps S140, S150 may be performed in the discharge limiting period (when the determination result of step S130 is YES) instead. In this case, it is possible to actively utilize the electric power of the power storage device 110 when it is not scheduled to use the vehicle 100 on the basis of the ascertainment of the user.

While this embodiment describes a plug-in hybrid automobile as the vehicle to which the present invention is applied, the configuration of the vehicle is not particularly limited as long as it can give and receive electric power to and from the outside of the vehicle by charging and discharging of the onboard power storage device. That is, the control of the power supply mode according to this embodiment can be applied to a series hybrid automobile, an electric automobile, a fuel-cell automobile, and the like.

The power equipment 900 that gives and receives electric power to and from the vehicle is not limited to this embodiment, but an arbitrary power equipment can be utilized. For example, the power supply control according to this embodiment can be applied to charging and discharging between a vehicle and an onboard power storage device of another vehicle.

While this embodiment describes the configuration in which the vehicle 100 and the power equipment (HEMS) 900 are electrically connected to each other with the cable 400, the vehicle 100 and the power equipment 900 may be electromagnetically coupled to each other in a noncontact state to give and receive electric power. For example, by providing the power equipment 900 side and the vehicle 100 side with coils, a configuration in which electric power is input and output by magnetic coupling or resonance between the coils may be used instead of the cable 400. In this configuration, the coils disposed in the vehicle 100 and the power equipment 900 correspond to the "power node".

It should be understood that the above-mentioned embodiment is only an example but is not restrictive. The scope of the present invention is not defined by the above description but by the appended claims, and is intended to include all meanings equivalent to the claims and all modifications within the scope.

INDUSTRIAL APPLICABILITY

The present invention can be applied to an electric-motor vehicle configured to give and receive electric power to and from the outside of the vehicle by charging and discharging of an onboard power storage device, power equipment that gives and receives electric power to and from the electric-motor vehicle, and a power supply system including the electric-motor vehicle and the power equipment.

REFERENCE SIGNS LIST

100: vehicle
105: dynamic power output device
106: engine
107: motor generator
110: power storage device (onboard power storage device)
200: power converter
220: inlet
302, 904: voltage sensor
304, 906: current sensor
310, 920: communication unit
400: cable
410: connector
415: operation unit
417: switch
420: plug
440, ACL1 to ACL5, PL1: power line
800: commercial system power supply
900: power equipment (HEMS)
910: charging and discharging connector
915: display unit
930: converter
945: bidirectional PCS
950: distribution board
970: solar cell
975: PCS
990: controller
1000: load
1100: portable information terminal
S1, S2: SOC lower limit value
t1: charging end time
ta: discharge limiting period start time
tb, t2: discharge limiting period end time

The invention claimed is:

1. A power equipment configured to give and receive electric power to and from an electric-motor vehicle having a power storage device mounted thereon, the power equipment comprising:
    a power node configured to give and receive electric power to and from the electric-motor vehicle; and
    a controller configured to control charging and discharging of the power storage device with respect to the power equipment when electric power is able to be given and received between the power equipment and the electric-motor vehicle via the power node by charging and discharging of the power storage device,
    the controller configured to control discharging of electric power from the power storage device to the power equipment so as to provide a first period in which discharging of electric power from the power storage device to the power equipment is limited after the power storage device is externally charged, and
    the controller configured to control discharging of electric power from the power storage device to the power equipment so as to provide a second period in which discharging limitation in the first period is released at least after the first period ends, wherein
    the controller is configured to permit discharging of electric power from the power storage device until a state of charge of the power storage device is lowered to a first value in the first period and to permit discharging of electric power from the power storage device until the state of charge is lowered to a second value in the second period, and
wherein the first value is greater than the second value.

2. The power equipment according to claim 1, wherein the controller is configured to set the first period to a period from a time point at which external charging of the power storage device ends to a time point at which a predetermined period of time elapses thereafter, and the controller is configured to set the second period to a period after the predetermined period of time elapses.

3. The power equipment according to claim 1, wherein the controller is configured to control external charging on the basis of a charging end time designated by a user, the controller is configured to set the first period to a period from the charging end time to a time point at which the predetermined period of time (Tλ) elapses thereafter, and
the controller is configured to set the second period to a period after the predetermined period of time elapses.

4. The power equipment according to claim 1, wherein the controller is configured to cause a user to ascertain whether to discharge electric power from the power storage device when a discharging request is given to the power storage device in the second period.

5. The power equipment according to claim 1, wherein the controller is configured to cause a user to ascertain whether to perform external charging of the power storage device again after discharging of electric power from the power storage device in the second period ends.

6. The power equipment according to claim 1, wherein the controller is configured to permit discharging of electric power from the power storage device until a state of charge of the power storage device is lowered to a first value in the first period and to permit discharging of electric power from the power storage device until the state of charge is lowered to a second value in the second period, and
wherein the first value is greater than the second value.

7. The power equipment according to claim 6, wherein the controller is configured to set the first value on the basis of a history of information indicating an amount of electric power in the power storage device used in a predetermined operating period of the electric-motor vehicle.

8. The power equipment according to claim 1, wherein the controller is configured to inhibit discharging of electric power from the power storage device in the first period.

9. An electric-motor vehicle comprising:
a power storage device equipped on the vehicle;
a power node configured to give and receive electric power to and from the outside of the vehicle; and
a controller configured to control charging and discharging of the power storage device with respect to the outside of the vehicle when the power storage device is able to be charged or discharged with electric power with respect to the outside of the vehicle via the power node,
the controller configured to control discharging of electric power from the power storage device so as to provide a first period in which discharging of electric power from the power storage device to the outside of the vehicle is limited after the power storage device is externally charged with a power supply outside the vehicle, and
the controller configured to control discharging of electric power from the power storage device so as to provide a second period in which discharging limitation in the first period is released at least after the first period ends, wherein
the controller is configured to permit discharging of electric power from the power storage device until a state of charge of the power storage device is lowered to a first value in the first period and to permit discharging of electric power from the power storage device until the state of charge is lowered to a second value in the second period, and
wherein the first value is greater than the second value.

10. The electric-motor vehicle according to claim 9, wherein
the controller is configured to set the first period to a period from a time point at which external charging of the power storage device ends to a time point at which a predetermined period of time elapses thereafter, and
the controller is configured to set the second period to a period after the predetermined period of time elapses.

11. The electric-motor vehicle according to claim 9, wherein
the controller is configured to control the external charging on the basis of a charging end time designated by a user,
the controller is configured to set the first period to a period from the charging end time to a time point at which the predetermined period of time elapses thereafter, and
the controller is configured to set the second period to a period after the predetermined period of time elapses.

12. The electric-motor vehicle according to claim 9, wherein
the controller is configured to discharge electric power from the power storage device to the outside of the vehicle in response to a discharging request from a load outside the vehicle.

13. The electric-motor vehicle according to claim 12, wherein
the controller is configured to cause a user to ascertain whether to discharge electric power from the power storage device when the discharging request is given in the second period.

14. The electric-motor vehicle according to claim 9, wherein
the controller is configured to cause a user to ascertain whether to perform external charging of the power storage device again after the discharging of electric power from the power storage device in the second period ends.

15. The electric-motor vehicle according to claim 9, wherein
the controller is configured to permit discharging of electric power from the power storage device until a state of charge of the power storage device is lowered to a first value in the first period and to permit discharging of electric power from the power storage device until the state of charge is lowered to a second value in the second period, and
wherein the first value is greater than the second value.

16. The electric-motor vehicle according to claim 15, wherein
the controller is configured to set the first value on the basis of a history of information indicating an amount of electric power in the power storage device used in a predetermined operating period of the electric-motor vehicle.

17. The electric-motor vehicle according to claim 9, wherein
the controller is configured to inhibit discharging of electric power from the power storage device in the first period.

18. A power supply system comprising:
an electric-motor vehicle having a power storage device mounted thereon;
a power equipment configured to give and receive electric power to and from the electric-motor vehicle; and
a controller configured to control charging and discharging of the power storage device when electric power is able to be given and received between the power equipment and the electric-motor vehicle by charging and discharging of the power storage device,
the controller configured to control discharging of electric power from the power storage device to the power equipment so as to provide a first period in which discharging of electric power from the power storage device to the power equipment is limited after the power storage device is externally charged with electric power from the power equipment, and
the controller configured to control discharging of electric power from the power storage device to the power equipment so as to provide a second period in which discharging limitation in the first period is released at least after the first period ends, wherein
the controller is configured to permit discharging of electric power from the power storage device until a state of charge of the power storage device is lowered to a first value in the first period and to permit discharging of electric power from the power storage device until the state of charge is lowered to a second value in the second period, and
wherein the first value is greater than the second value.

19. The power supply system according to claim 18, wherein
the controller is configured to set the first period to a period from a time point at which external charging of the power storage device ends to a time point at which a predetermined period of time elapses thereafter, and
the controller is configured to set the second period to a period after the predetermined period of time elapses.

20. The power supply system according to claim 18, wherein
the controller is configured to control external charging on the basis of a charging end time designated by a user,
the controller is configured to set the first period to a period from the charging end time to a time point at which the predetermined period of time (Tλ) elapses thereafter, and
the controller is configured to set the second period to a period after the predetermined period of time elapses.

21. The power supply system according to claim 18, wherein
the controller is disposed in the power equipment, and
the controller is configured to cause a user to ascertain whether to discharge electric power from the power storage device in the second period, and
the controller is configured to request the electric-motor vehicle for discharging of electric power from the power storage device when the user permits discharging of electric power from the power storage device.

22. The power supply system according to claim 18, wherein
the controller is configured to cause a user to ascertain whether to perform external charging of the power storage device again after discharging of electric power from the power storage device in the second period ends.

23. The power supply system according to claim 18, wherein
the controller is configured to set the first value on the basis of a history of information indicating an amount of electric power in the power storage device used in a predetermined operating period of the electric-motor vehicle.

24. The power supply system according to claim 18, wherein
the controller is configured to inhibit discharging of electric power from the power storage device in the first period.

25. The power supply system according to claim 18, wherein
the electric-motor vehicle and the power equipment are electrically connected to each other with a cable.

* * * * *